United States Patent [19]

Matsumoto

[11] Patent Number: 6,147,291
[45] Date of Patent: *Nov. 14, 2000

[54] STYLE CHANGE APPARATUS AND A KARAOKE APPARATUS

[75] Inventor: Shuichi Matsumoto, Hamamatsu, Japan

[73] Assignee: Yamaha Corporation, Hamamatsu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/787,972

[22] Filed: Jan. 23, 1997

[30] Foreign Application Priority Data

Jan. 29, 1996 [JP] Japan .................................. 8-013242

[51] Int. Cl.[7] .............................. G09B 5/00; G09B 15/04; G10H 1/06; G10H 1/42
[52] U.S. Cl. ................................. 84/611; 84/622; 84/635; 84/477 R; 84/DIG. 12; 434/307 A
[58] Field of Search ..................... 84/609–614, 634–638, 84/477 R, 478, DIG. 12, 622–625; 434/307 A

[56] References Cited

U.S. PATENT DOCUMENTS

| 4,872,385 | 10/1989 | Oguri et al. | 84/635 |
| 5,262,583 | 11/1993 | Shimada | 84/609 |
| 5,262,584 | 11/1993 | Shimada | 84/609 |
| 5,499,921 | 3/1996 | Sone | 84/609 X |
| 5,574,243 | 11/1996 | Nakai et al. | 84/609 |

*Primary Examiner*—Stanley J. Witkowski
*Attorney, Agent, or Firm*—Pillsbury Madison & Sutro LLP

[57] ABSTRACT

On an initial screen, a conversion ratio indicated by a style conversion ratio data is displayed in a display area 32. Various kinds of styles are displayed in display areas 33 to 38. In this case, a style which is currently selected is "Samba" which blinks, and the conversion ratio is 50%. When a style number corresponding to samba is "2," a style change is conducted for the original performance data based on a style conversion data corresponding to the style number 2. At this time, the conversion ratio of 50% is referred, and changes of a sound-producing timing, a tone color, an additional instrument, and the like are conducted. An image displayed on a monitor is changed based on an image conversion data.

22 Claims, 6 Drawing Sheets

```
┌─MUSIC PIECE DATA KD──────────┐
│                              │
│   PERFORMANCE DATA    KDE    │
│                              │
│   WORDS DATA          KDK    │
│                              │
│   IMAGE DATA          KDG    │
│                              │
└──────────────────────────────┘
```

FIG. 7
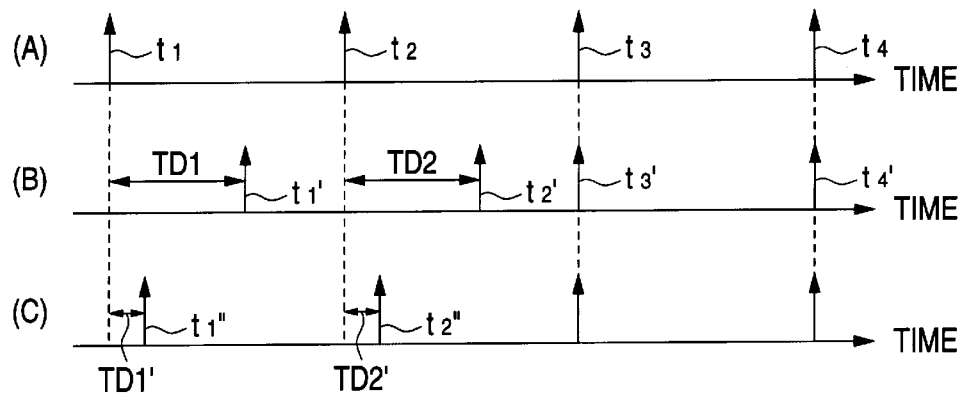
FIG. 8
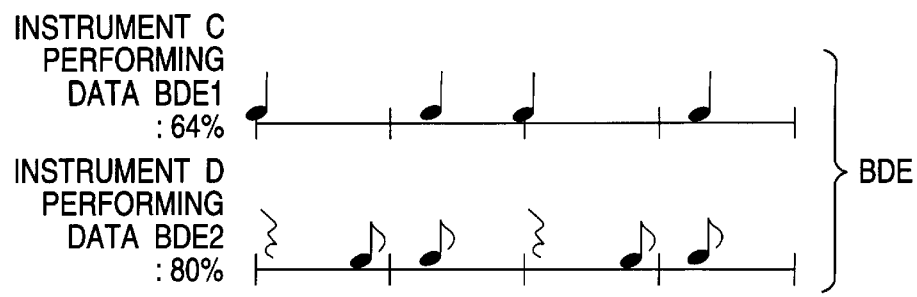
FIG. 9

STYLE CHANGE APPARATUS AND A KARAOKE APPARATUS

BACKGROUND OF THE INVENTION

1. Field of the Invention

The invention relates to a style change apparatus for changing style of a music piece and a karaoke apparatus using the same, and particularly to an apparatus which can adjust the degree of change to a desired style.

2. Related Art

In a karaoke apparatus, when a music piece is specified, performance data are read out from storing means in accordance with the specified music piece, and a performance of the music piece is reproduced based on the performance data. The performance data are often configured in the form of MIDI (Musical Instrument Digital Interface). In this case, the performance data are configured by a plurality of data series parameter which are called tracks. One track controls one sound source.

Generally, performance data used in a karaoke apparatus are produced by way of editing and processing. The performance data are once written on a recording medium by an apparatus called a sequencer, and then read out. The sequencer functions by conducting a change of the sound-producing timing indicated by the performance data on the performance data in one track, and a function of changing the volume. In a case where the volume is to be changed, for example, a track on which the change is to be performed is first selected, and the performance data corresponding to the selected track are read out from the recording medium. Next, a period is adjusted when the volume is changed, and a volume value after the change is input so as to conduct the volume change on the read out performance data. The performance data which have been changed are stored again on the recording medium. Performance data are produced by repeating such a change process.

Some karaoke apparatuses have a plurality of tracks corresponding to various kinds of rhythms. In such a type of karaoke apparatus, when the user operates an apparatus panel so as to input a desired rhythm, performance data are read out from a track corresponding to the input rhythm, and a performance in accordance with the desired rhythm is performed.

There are various styles of music pieces such as samba and bossa nova. If styles can be freely changed for one music piece, a singer can enjoy various atmospheres in accordance with the time of singer's feeling (i.e., the mood) at the singing.

In a conventional karaoke apparatus having a plurality of tracks corresponding to various kinds of rhythms, however, the part of rhythm (generally, the part of percussion) is changed, but the other parts such as the melody and the base are not changed. For this reason, the music piece after the change may sometimes be unnatural. If the change is conducted on all the parts in order to improve the unnaturalness, the amount of data for conducting the change of various kinds of styles is huge.

In a sequencer, the selection of a track which is to be changed, and the change of the performance data are manually input, so that it is impossible to change the performance data in real time. In addition, the performance data which can be changed at one time in the sequencer are limited to data in one track, and hence it is still more impossible to change all of the tracks. Even if a sequencer is applied to a karaoke apparatus, therefore, the performance style cannot be changed in real time.

SUMMARY OF THE INVENTION

The invention has been conducted in view of the above-described circumstances. It is an object of the invention to provide a karaoke apparatus in which the style of a music piece can be changed in real time while the amount of data is not increased to a burdensome level.

In order to solve the problems, the present invention provides a style change apparatus which changes performance data for playing an original music piece, thereby changing a style of the original music piece, and which comprises: storing means for storing the performance data and for storing style data for changing the style of the original music piece to various styles in units of predetermined periods; first inputting means for inputting a desired style; second inputting means for inputting a conversion data indicating a degree of a style change; and changing means for changing the performance data in units of the predetermined periods, based on the style data corresponding to the input style, and the input conversion data.

In order to solve the problems, the present invention is provided a karaoke apparatus which comprises a style change apparatus, and which displays an image including words and a background on a monitor in accordance with a progress of the music piece, wherein the storing means stores a display data for designating an image which is to be displayed on the monitor, each of the style data includes a display change data for changing an image to be displayed on the monitor, and the karaoke apparatus comprises: image storing means for storing images which are to be displayed on the monitor; display means for reading out the image designated by the style data corresponding to the style which is input through the first inputting means, from the image storing means, and for displaying the image on the monitor; synthesizing means for synthesizing a performance signal based on the performance data which is changed by the changing means with a voice signal from a microphone; and sound producing means for producing sounds based on an output signal of the synthesizing means.

BRIEF DESCRIPTION OF THE DRAWINGS

FIG. 7 is a diagram illustrating change processing of a sound-producing timing according to the embodiment.

FIG. 8 is a diagram showing the data configuration of a tone color conversion map according to the embodiment.

FIG. 9 is a diagram showing the data configuration of an additional instrument performance data according to the embodiment.

DETAILED DESCRIPTION OF THE PREFERRED EMBODIMENTS

1. Configuration of embodiment

Figure 1:
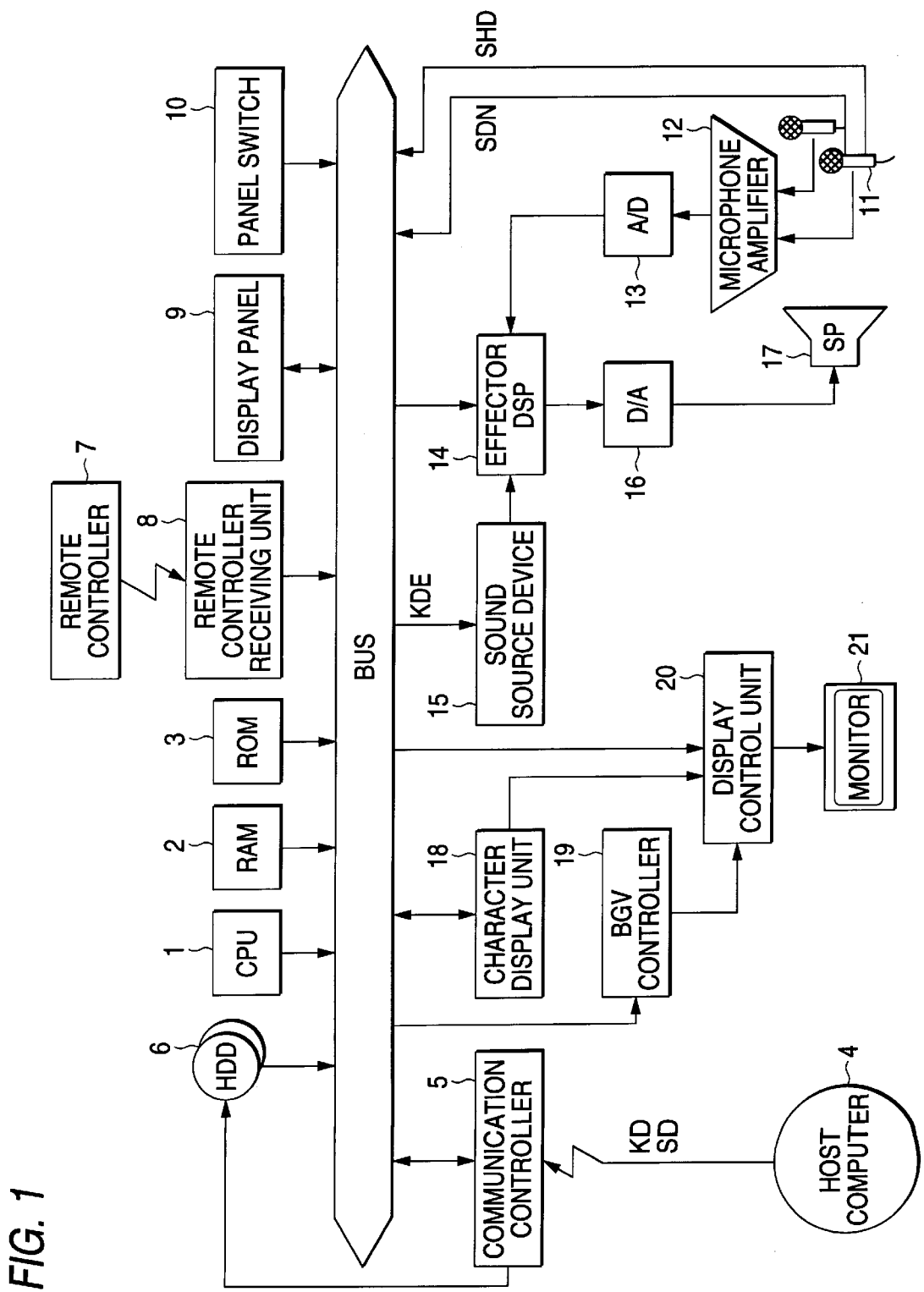
FIG. 1 is a block diagram of an embodiment of the karaoke apparatus according to the invention.

Hereinafter the configuration of an embodiment of the invention will be described with reference to the accompanying drawings. FIG. 1 is a block diagram of an embodiment of the karaoke apparatus according to the invention.

Referring to FIG. 1, 1 designates a CPU (Central Processing Unit) which controls various portions of the apparatus connected to the CPU via a bus. The reference numeral 2 designates a RAM in which the memory space functions as a work area for the CPU 1 and temporarily stores various kinds of data. The reference numeral 3 designates a ROM which stores programs for controlling the whole of the karaoke apparatus and various types of font information for displaying words.

The reference numeral 4 designates a host computer which is connected to the karaoke apparatus via a communication line which is not shown. The host computer 4 distributes music piece data KD in a unit of a predetermined number of music pieces, and also a style data SD which is used for changing the style. The reference numeral 5 designates a communication controller which is configured by a modem or the like and conducts data communication with the host computer 4, and 6 designates a hard disk which is connected to the communication controller 5 and stores music piece data KD and style data SD.

The reference numeral 7 designates a remote controller. A signal in accordance with the operation of the remote controller 7 is transmitted to the karaoke apparatus by means of infrared rays or the like. When the user inputs a music-piece code, a key, a tempo, and the like by using the remote controller 7, the input operation is detected and a detection signal is generated. The reference numeral 8 designates a remote controller receiving unit which receives the detection signal from the remote controller 7 and transfers the signal to the CPU 1, and 9 designates a display panel disposed at the front of the karaoke apparatus. The selected music-piece code, a style number indicating the selected kind of style, and the like are displayed on the display panel. The reference numeral 10 designates a panel switch disposed on the face on which the display panel 9 is disposed. The panel switch has the same function as that of the remote controller 7.

Figures 2, 3:
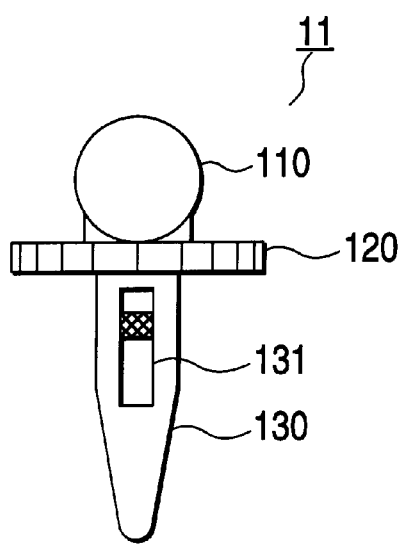
FIG. 2 is a front view of a microphone used in the embodiment.
FIG. 3 is a diagram showing the data configuration of a music piece data according to the embodiment.

The reference numeral 11 designates a microphone which converts a signing voice into a voice signal. FIG. 2 is a front view of the microphone 11. In the figure, 110 designates a spherical microphone hood, and 130 designates a cone-like grip portion. A disk-like style selection switch 120 is disposed between the microphone hood 110 and the grip portion 130. The axis of the style selection switch is common to that of the grip portion 130. The style selection switch 120 is disposed so as to be rotatable about its axis. By rotating the style selection switch, the user can select a desired style. Styles which are previously prepared include bossa nova, samba, jazz, etc.

The reference numeral 131 designates a conversion ratio input volume disposed in the grip portion 130. The conversion ratio input volume 131 is configured by a variable resistor of the slide type and is used for inputting a conversion ratio. The conversion ratio indicates the degree of a change from the original style to the desired style.

In the microphone 11, the rotation of the style selection switch 120 is detected, and a style number data $SD_N$ for identifying the input style is generated. Style numbers are previously determined for respective styles. For example, the style number=1 designates the style of bossa nova, and the style number=2 designates the style of samba. The microphone 11 generates also a style conversion data $SD_H$ in accordance with the resistance of the conversion ratio input volume 131. The style conversion data $SD_H$ indicates the conversion ratio of 0% to 100%. The control is conducted in the following manner. When the conversion ratio designated by the style conversion data $SD_H$ is 100%, for example, the original style is completely converted into the desired style. When the conversion ratio is 0%, the original style is maintained.

The reference numeral 15 shown in FIG. 1 designates a sound source device which comprises a plurality of sound sources. The sound source device 15 is controlled by performance data $KD_E$ in the music piece data KD. One sound source generates musical-tone data based on the performance data corresponding to one track.

The voice signal from the microphone 11 is amplified by a microphone amplifier 12 and then converted into a digital signal by an A/D converter 13. The digital signal is supplied to an effector DSP 14 as voice data. The effector DSP 14 receives also the musical-tone data generated in the sound source device 15. The effector DSP 14 applies an echo effect to the voice data and the musical-tone data, or conducts the pitch conversion designated by the key input through the remote controller 7. The data output from the effector DSP 14 are converted into an analog signal by a D/A converter 16, and the signal is amplified by an amplifier which is not shown. Then, the amplified signal is supplied to a loud speaker 17 and the sound is generated.

The reference numeral 18 designates a character display unit. Under the control of the CPU 1, the character display unit 18 reads out font information stored in the ROM 3 in accordance with a words data $KD_K$ read out from the hard disk 6, and conducts the control for changing the color of the words displayed in an accompanying manner with the progress of the music piece. The reference numeral 19 designates a BGV controller which contains an image storage device such as a laser disk therein. The BGV controller 19 reads out image information corresponding to the music piece data KD for which the reproduction is designated, from the image storage device, and transfers the image information to a display control unit 20. The display control unit 20 synthesizes the image information from the BGV controller 19 with the font information from the character display unit 18 and controls a monitor 21 so as to display the synthesized information. In the case where the change of style is input, the type of the font information of the character display unit 18 may be changed in accordance with the style data SD, or the image information read out from the image storage device may be changed.

2. Configuration of data

Next, the configuration of the music piece data KD and the style data SD will be described with reference to FIGS. 3 to 9.

2-1. Music piece data

Figure 4:
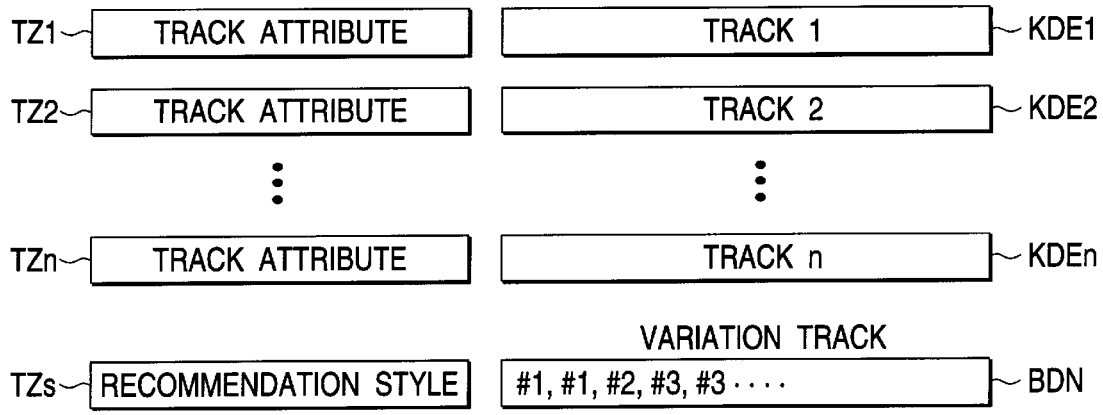
FIG. 4 is a diagram showing the data configuration of a performance data according to the embodiment.

The music piece data KD are provided for each of music-piece codes which specify music pieces. As shown in FIG. 3, each music piece data KD is configured by a performance data $KD_E$, a words data $KD_K$ and an image data $KD_G$. The performance data $KD_E$ is the data for controlling the sound source device 15 as described above. The data structure of the performance data $KD_E$ is shown in FIG. 4. As shown in the figure, the performance data $KD_E$ is a data string having a plurality of tracks 1 to n. In this case, track performance data $KD_{E1}$ to $KD_{En}$ corresponding to individual tone colors (instruments) are stored in the respective tracks. Each of the track performance data $KD_{E1}$ to $KD_{En}$ controls one sound source in the sound source device 15. Code data TZ1 to TZn indicating track attributes are written in the respective tracks. Each track attribute indicates a function of the performance data KDE of the corresponding track in the music piece. The functions include the melody, the base, the rhythm, the harmony, etc. The performance data KDE comprises a variation track. The style of the performance is designated by data stored in the variation track.

The representation and the image of a music piece are often varied during when the music piece progresses. When the progress of a music piece is considered from this point of view, one music piece is divided into periods of, for example, a sing portion, an intermission, and an ending portion. The sing portion has a portion in which the singer's emotion rises, i.e., so-called SABI. In addition, the sing portion has several supplemental portions which are inserted in the music piece and which are called OKAZU.

Accordingly, in the embodiment, in order to realize appropriate performances for the respective periods, a plurality of variations are set for one style, and a variation is designated for each period. For example, variations are designated in such a manner that a variation 1 is designated for the starting portion, a variation 2 is designated for the sing portion, a variation 3 is designated for the ending portion, and so on. In an example case where a plurality of variations (variations for one and the same rhythm) such as samba 1, samba 2, samba 3, and the like are previously set with respect to the samba style, the variations are designated in such a manner that the samba 1 is designated for the starting portion, the samba 2 is designated for the sing portion, and the samba 3 is designated for the ending portion. In the following description, the data designating the variation is referred to as a variation number designating data BDN. In the above-mentioned variation track, the variation number designating data BDN is stored in accordance with the progress of the performance. In the figure, the symbols #1, #2, and #3 designate variations 1, 2, and 3, respectively. As a recommended style, a recommended style data KDS is written. The recommended style data KDS is a data for designating a recommended style number.

The words data KDK shown in FIG. 3 is a data for displaying the words of the music piece on the monitor 21, and consists of a data designating a character code and the type of character font. In a karaoke apparatus, in accordance with the progress of a music piece, the color of words displayed on the monitor 21 is usually changed. To comply with this, the words data KDK includes a data for designating the change of the character color. Based on the data, the color of the words is changed. The image data KDG is a data for designating a background image which is to be displayed on the monitor 21. In accordance with the designation, one of the background images which are stored in the above-mentioned image storage device is read out.

2-2. Style data

Figure 5:
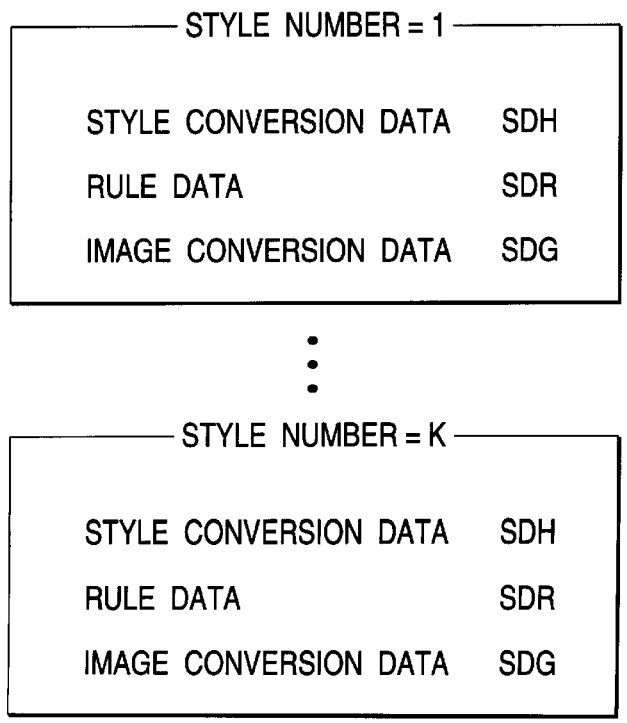
FIG. 5 is a diagram showing the data configuration of a style data according to the embodiment.

Next, the style data SD (see FIG. 5) will be described. The style data SD is a data for designating the change of the original music piece data KD. There exist various kinds of style data SD. For example, one kind of style data SD designates the style of samba, and another kind of style data SD designates the style of bossa nova. Consequently, a style number for identifying the style is attached to the style data SD. FIG. 5 shows a case in which the style numbers 1 to K are used.

As shown in the figure, the style data SD consists of a style conversion data SDH, a rule data SDR, and an image conversion data SDG. These data will be described below.

2-2-1. Style conversion data

Figure 6:
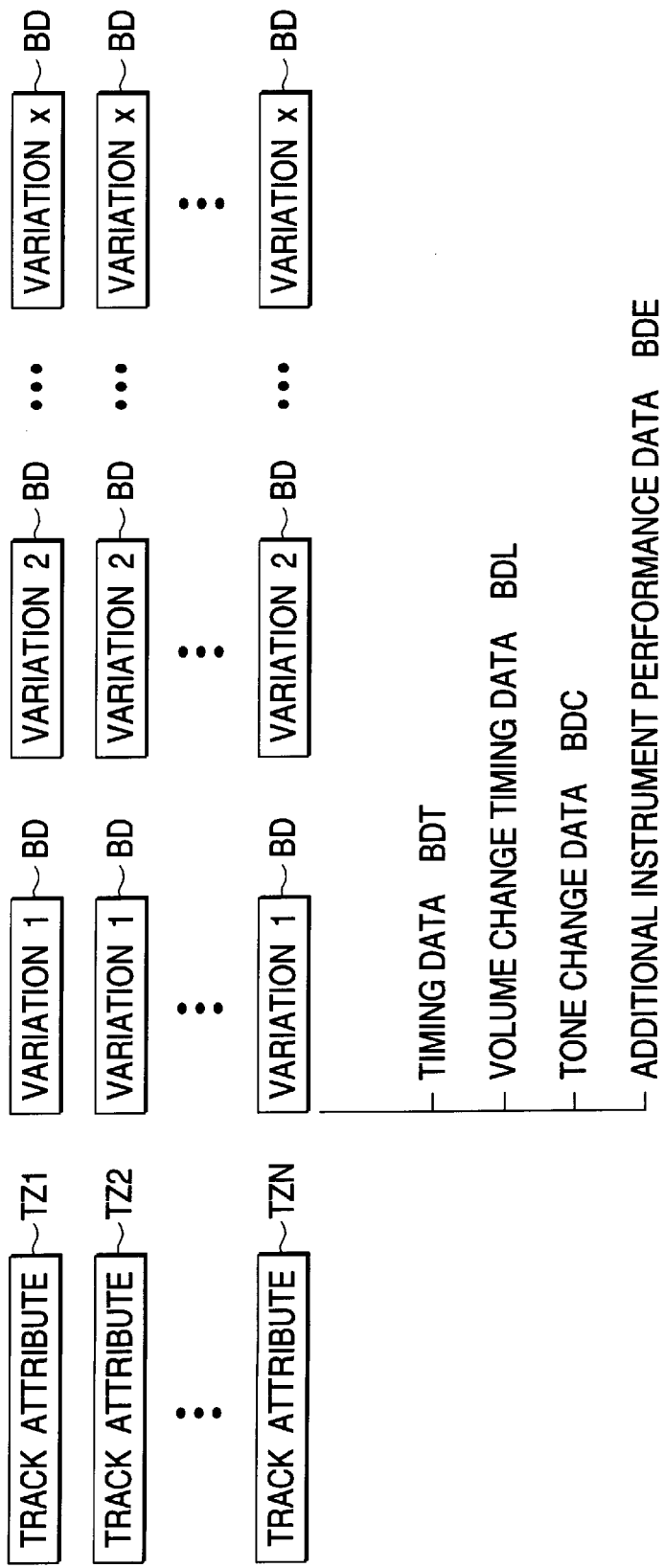
FIG. 6 is a diagram showing the data configuration of a style conversion data according to the embodiment.

First, the style conversion data SDH is a data for designating the manner of changing the track performance data KDE1 to KDEn. FIG. 6 shows the configuration of the data. As shown in the figure, the style conversion data SDH are classified into groups corresponding to the respective tracks of the performance data KDE (see FIG. 4), and specified by track attribute data TZ1 to TZN which are allocated to the respective groups.

In each group, variation data BD respectively corresponding to the variations 1 to x are disposed. These variation data BD are data for designating the change of a sound-producing timing, a volume, and the like indicated by the track performance data KDE1 to KDEn of the corresponding track. A variation data BD corresponding to the above-mentioned variation number designating data BDN is read out.

Accordingly, in accordance with the track attribute data TZ1 to TZN and the variation number designating data BDN, any one of variation data BD shown in FIG. 6 is specified. When, for example, the track attribute data TZ2 shown in the figure designates the melody and the variation number designating data BDN in the period of SABI is #2, the style change of the melody in the period of SABI is conducted based on the variation data BD stored in a box portion enclosed by a thick line.

As shown in FIG. 6, the style conversion data SDH consists of a timing change data BDT, a volume change data BDL, a tone color change data BDC, and an additional instrument performance data BDE. The timing change data BDT is a data for designating the change of a sound-producing timing. The rule of the change processing of the sound-producing timing is defined by a rule data SDR which will be described later.

An example of the change processing of the sound-producing timing will be described. In this example, the change processing of the sound-producing timing is conducted in the following processes. Specifically, (1) a difference time between the original performance data KDE and the timing change data BDT is calculated, (2) the difference time is multiplied by a conversion ratio indicated by the style conversion ratio data SHD, (3) the multiplication result is multiplied by a weighting coefficient indicated by the rule data SDR, and (4) the sound-producing timing of the original performance data KDE is changed by the obtained time.

The processing will be specifically described with reference to FIG. 7. For example, timings t1 to t4 indicated by upward arrows shown in (A) of the figure are the sound-producing timing indicated by the original performance data KDE, and timings t1' to t4' indicated by upward arrows shown in (B) of the figure are the sound-producing timing indicated by the change data BDT. It is also assumed that the conversion ratio indicated by the style conversion ratio data SHD is 50% and the weighting value indicated by the rule data SDR is 50%.

In this case, difference times between the sound-producing timings t1 and t2 indicated by the original performance data KDE and the sound-producing timings t1' and t2' indicated by the change data BDT are detected. The difference times are TD1 and TD2 shown in FIG. 7(B). Next, the difference times TD1 and TD2 are multiplied by the conversion ratio of 50% and the weighting value of 50%. As a result, difference times TD1' and TD2' between the sound-producing timings t1" and t2" after the change and the sound-producing timings t1 and t2 of the original performance data KDE are given by the following expressions:

$$TD1'=TD1\times0.5\times0.5$$

$$TD2'=TD2\times0.5\times0.5$$

The sound-producing timings t3 and t4 indicated by the original performance data KDE and the sound-producing timings t3' and t4' indicated by the change data BDT simultaneously occur, so that any change is not performed.

Next, the volume change data BDL shown in FIG. 6 is a data for designating the volume value after the change. The tone color change data BDC is a data for designating the condition on which the tone color change is conducted and the tone color after the change. The condition in which the tone color change is conducted is indicated by a predetermined value. When the conversion ratio indicated by the style conversion ratio data SHD which is input by the karaoke user exceeds the predetermined value, the tone color is changed. When the conversion ratio is lower than the predetermined value, the tone color is not changed. The tone color change data BDC is represented by a tone color change map such as that shown in FIG. 8. In the figure, instruments 1 to X are shown. This means that, in the original performance data KDE, the tone color change is performed in the corresponding track. In this case, when the conversion ratio indicated by the style conversion ratio data SHD exceeds 48%, the tone color of the instrument 2 is changed to that of the instrument B. When the conversion ratio exceeds 53%, the tone color of the instrument 1 is changed to that of the instrument A. When the original style is the rock, and the selected style is the samba, for example, it is assumed that the instrument 2 shown in FIG. 8 is a drum, and the instrument B is claves. In this example, in the case where the singer gradually increases the conversion ratio by operating the conversion ratio input volume 131, after the timing when the input conversion ratio exceeds 48%, the tone color of a drum is changed to that of claves.

The additional instrument performance data BDE shown in FIG. 6 consists of a condition on which an instrument is added and performance data of the added instrument. The condition on which the instrument is added is indicated by a predetermined value. When the conversion ratio of the style conversion ratio data SHD input by the karaoke user exceeds the predetermined value, an instrument is added. When the conversion ratio is lower than the predetermined value, no instrument is added. For example, if the additional instrument performance data BDE is a data shown in FIG. 9, when the conversion ratio of the style conversion ratio data SHD exceeds 64%, the instrument C is performed based on the performance data BDE1. When the style conversion ratio data SHD exceeds 80%, also the instrument C is performed based on the performance data BDE2.

2-2-2. Rule data

The rule data SDR shown in FIG. 5 is a data for designating the rule by which the style is changed. The rule data SDR defines the algorithm of the above-mentioned change control of the sound-producing timing, and the algorithm for changing the font of words and the background image. The reason why the rule data SDR is included in the style data SD and is independent of the music piece data KD is that the grade up of the version of the style change processing, and the like are enabled by redistributing the rule data SDR from the host computer 4.

2-2-3. Image conversion data

The image conversion data SDG shown in FIG. 5 consists of a data for designating a background image in accordance with the style number, and a data for designating the type of character font. Depending on the image conversion data SDG, an image in accordance with the style designated by the user is displayed on the monitor 21.

2. Operation of the embodiment

Hereinafter, the entire operation of the embodiment of the invention will be described with reference to the drawings. In FIG. 1, when the user operates the remote controller 7 or the panel switch 10 so as to designate the music-piece code of a desired music piece, the CPU 1 detects the designation. The CPU 1 accesses the hard disk 6, and transfers the music piece data KD corresponding to the designated music-piece code and the style data SD to the RAM 2. The CPU 1 controls also the display control unit 20 so as to display an initial image for displaying the designated music-piece code and the like on the monitor 21.

Figure 10:
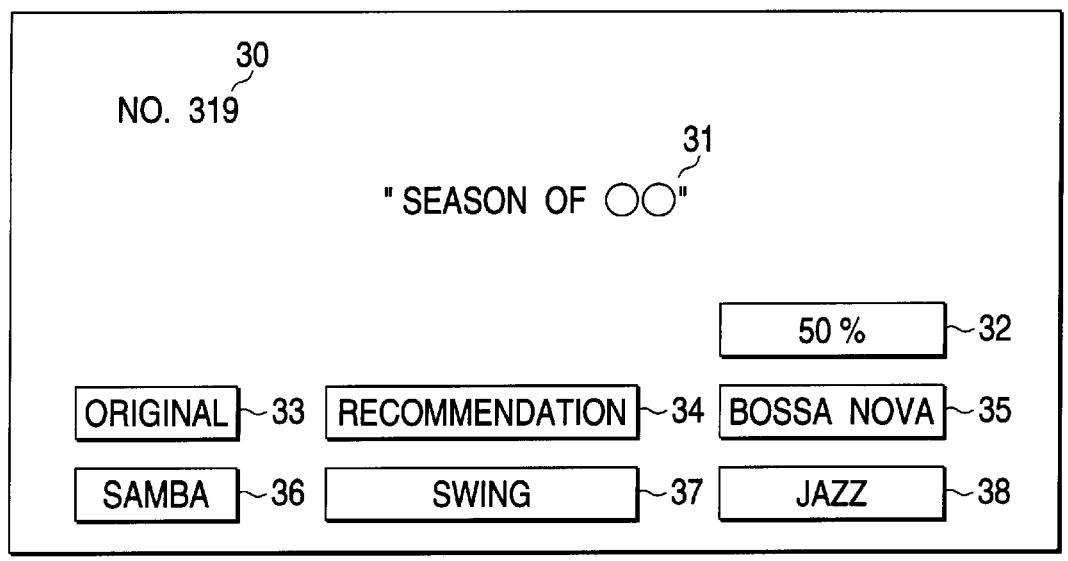
FIG. 10 is a diagram illustrating an initial screen of a monitor according to the embodiment.

When the designated music-piece code is "319" and the title of the music piece is "The Season of oo," for example, the initial screen is displayed as shown in FIG. 10. In display areas 30 and 31, "319" and "The Season of oo" are displayed, respectively. On the initial screen, the conversion ratio indicated by the style conversion ratio data SHD is displayed in a display area 32. In accordance with the display, the user can input a desired conversion ratio by operating the conversion ratio input volume 131 in the microphone 11 which is kept in hand.

In display areas 33 to 38 of the initial screen, various styles are displayed, and the style which is currently selected blinks. In accordance with the display, the user operates the style selection switch 120 in the microphone 11 kept in hand, so as to input a desired style. When the style selection switch 120 is operated so as to cause "Original" displayed in the display area 33 to blink, for example, the change of the style is not conducted, and the performance is performed based on the original music piece data KD. When the style selection switch 120 is operated so as to cause "Recommended" displayed in the display area 33 to blink, the performance of the recommended style is performed. In this case, the CPU 1 detects the recommended style data KDS (see FIG. 4) in the performance data KDE, and conducts the style change on the original music piece data KD based on the style data SD corresponding to the style number which is designated by the recommended style data KDS.

In the following, description is conducted by way of an example shown in FIG. 10. In this example, the style selection switch 120 is operated so as to cause "Samba" in the display area 33 to blink, and the conversion ratio input volume 131 is operated so that the conversion ratio is set to be 50%. When the style number corresponding to the samba is "2," the style change is conducted on the original performance data KDE based on the style conversion data SDH corresponding to the style number 2. The image displayed on the monitor 21 is changed based on the image conversion data SDG.

Figure 11:
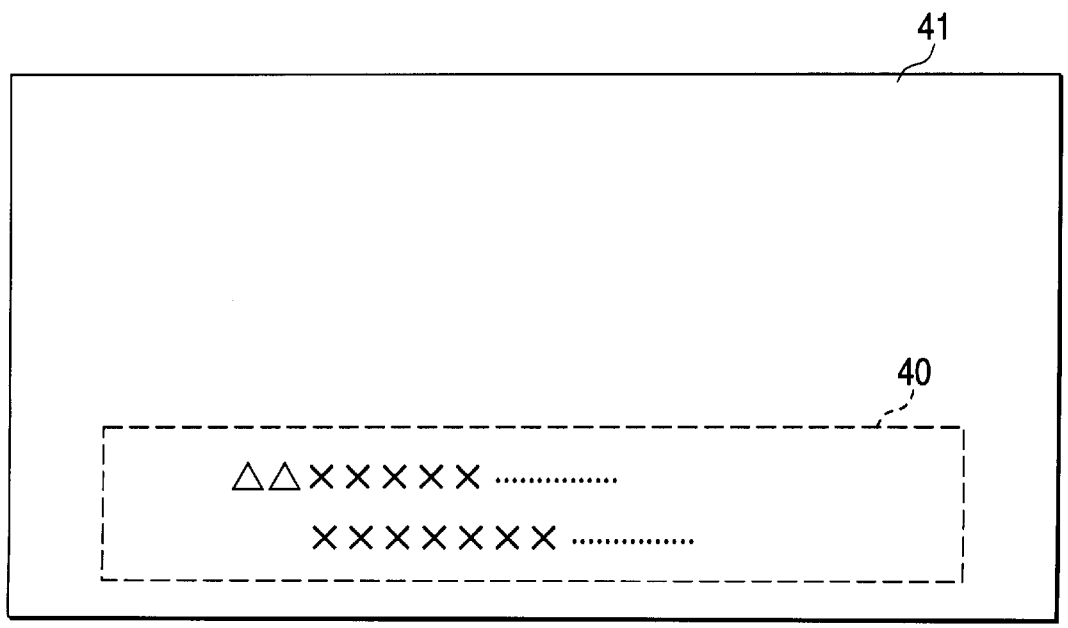
FIG. 11 is a diagram illustrating a monitor screen after a performance is started, according to the embodiment.

When the performance of a music piece is started, the screen shown in FIG. 11 is displayed on the monitor 21. The words corresponding to the designated music piece are displayed in a display area 40, and the type of character font is changed based on the image conversion data SDG. In this example, a character font (e.g., Gothic) which is suitable for the image of samba is selected. A background image is displayed in a display area 41 based on the image conversion data SDG. In this example, a background image (e.g., palm trees and the sea which are the image of summer) which is suitable for the image of samba is selected.

Various changes are conducted on the performance of the music piece. FIG. 8 shows a tone color conversion map in this example. It is assumed that the instrument 2 in the figure is a drum, and the instrument B is claves. Since the above-mentioned conversion ratio of 50% exceeds the predetermined value 48% designated by the tone color conversion map, the performance is performed with changing the tone color of a drum to that of claves. The sound-producing timing in this case is changed based on the timing change data BDT. In this example, the additional instrument performance data BDE is as shown in FIG. 9, and the instrument C in the figure is maracas. It is assumed that the user operates the conversion ratio input volume 131 during the singing so as to increase the conversion ratio to 70%. After the timing when the conversion ratio exceeds 64%, the musical tone of the maracas is added to the performance.

In this way, the karaoke user can operate the microphone 11 kept in hand so as to designate the desired style and the changing degree of the style. Accordingly, various styles can be enjoyed in one music piece.

As seen from the above description, the embodiment can attain the following effects.

(1) The original music piece data KD can be changed by adding only the style data SD which is required for the style change. Therefore, a detailed arrangement can be conducted with a reduced amount of data.

(2) Not only the performance data KDE in one track is changed, but also the performance data KDE in the respective tracks are changed. Therefore, an arrangement in which parts corresponding to the respective tracks are related to each other can be realized and it is possible to play the music piece naturally.

(3) A percussion which is characteristic to the selected style can be added, and the tone color of the instrument can be changed to another one which is more suitable for the selected style. Therefore, the atmosphere of the music piece is drastically changed and a high arrangement effect can be attained.

(4) The sound-producing timing, the addition of instruments, and the tone color change can be controlled in accordance with the input conversion ratio. Therefore, the style can be continuously changed, and a performance with high entertainment characteristics can be realized.

(5) Since any change is not made in the music piece data KD, a music piece data KD which is conventionally used can be used as it is in the above-described karaoke apparatus. A music piece data KD used in the above-described karaoke apparatus can be used in a conventional karaoke apparatus. Some music piece data KD which are conventionally used are not provided with track attributes. In such a case, track attributes may be determined based on the singing range, the tone color number, the number of tones which can be simultaneously produced, and the like which are designated by the performance data in the track, and a corresponding track attribute code may be added, so that the music piece data can be used in the above-described karaoke apparatus.

(6) The style data SD is configured independent of the music piece data KD. When only the style data SD is redistributed from the host computer to each karaoke terminal apparatus, therefore, the version of the style change of the music piece can be graded up. At this time, it is possible to conduct the change in the unit of the respective style numbers, the change for the respective style conversion data SDH, the rule data SDR, or the image conversion data SDG.

(7) The style number data SDN and the style conversion ratio data SHD can be input through the microphone 11. Therefore, the singer can select the style and input the style changing degree while singing.

3. Modifications

The invention is not limited to the above-described embodiment, and can be applied to, for example, the following various modifications.

(1) In the embodiment, the style change of a music piece in a karaoke apparatus has been described as an example. However, the invention is not limited to this example. The invention can be applied to a style change apparatus in which the style of the performance data KDE is changed. In this case, the technique can be applied to wire broadcasting, and the like.

(2) In the embodiment, when the change processing of the original performance data KDE is conducted by using the volume change data BDL, the rule data SDR may be set so that the change is conducted in view of the style conversion ratio data SHD. In this case, a predetermined value may be included in the volume change data BDL as a change condition, and the control may be conducted so that, if the predetermined value is exceeded, the volume is changed, and if the predetermined value is not exceeded, the volume is not changed.

(3) In the embodiment, the tone color change data BDC corresponding to the style number is configured by a tone color conversion map. This is because the change of the tone color in the original performance data KDE is conducted in one track. In a case where the tone color is not changed in the original performance data KDE in one track, a tone color conversion map for each variation may be used.

(4) In the embodiment, the style number data SDN and the style conversion ratio data SHD are input through the microphone 11. Alternatively, these may be input by using the touch panel 10.

From the above description, in addition to the inventions, inventive ideas such as those listed below can be extracted.

1) A style change apparatus includes the performance data includes a sound-producing data for designating a sound-producing timing of a musical tone, each of the style data includes a sound-producing change data for changing the sound-producing timing of a musical tone, and the changing means changes the sound-producing data in the performance data so as to be closer to the sound-producing timing indicated by the sound-producing change data, as the style changing degree indicated by the conversion data is larger.

2) A style change apparatus according the present invention, wherein the performance data includes volume data for designating a volume of a musical tone, each of the style data includes a volume change data for designating a volume after a change, and the changing means changes the volume data to the volume change data.

3) A style change apparatus according the present invention, wherein the performance data includes a tone color data for designating a tone color, each of the style data includes a tone color change data for designating a tone color after a change, and a data for designating a predetermined value, and the changing means converts the tone color data to the tone color change data when a value of the conversion data exceeds the predetermined value, and conducts no conversion of the tone color data when the value of the conversion data is lower than the predetermined value.

4) A style change apparatus according to the present invention, wherein each of the style data includes an additional performance data for indicating a musical tone of an additional instrument, and a data for designating a predetermined value, and the changing means adds the additional performance data to the performance data when a value of the conversion data exceeds the predetermined value, and conducts no addition of the additional performance data when the value of the conversion data is lower than the predetermined value.

As described above, according to the present invention, the original style of a music piece can be changed to a desired style. In addition, the sound-producing timing, the tone color, the addition of an instrument, and the like can be changed in accordance with the desired degree. According to the present invention, the change of a music-piece style can be applied to a karaoke apparatus, and it is possible to change a screen displayed on a monitor to a screen according to the desired style.

What is claimed is:

1. A karaoke apparatus comprising:

storing means for storing performance data and for storing style data for changing the style of an original music piece to various styles;

first inputting means for inputting a desired style;

second inputting means for inputting conversion data indicating an amount of a style change between the style of the original music piece and the desired style; and changing means responsive to said first and second inputting means for changing the performance data of the original music piece, based on the style data corresponding to the input style, the conversion data, and a threshold value, wherein the changing means utilizes a changing map including the performance data, the style data, and the conversion data for changing the performance data of the original music piece when the amount of style change exceeds the threshold value.

2. A karaoke apparatus as claimed in claim 1, further comprising:

a monitor for displaying an image including words and a background in accordance with progress of the music piece shown thereon;

image storing means for storing images which are to be displayed on said monitor;

display means for reading out the image designated by the style data corresponding to the style which is input through said first inputting means, from said image storing means, and for displaying the image on said monitor;

synthesizing means for synthesizing a performance signal based on the performance data which is changed by said changing means with a voice signal from a microphone; and sound producing means for producing sounds based on an output signal of said synthesizing means, wherein said storing means stores display data for designating an image which is to be displayed on said monitor, and each of the style data includes display change data for changing an image to be displayed on said monitor.

3. A karaoke apparatus according to claim 1, wherein the performance data includes sound-producing data for designating sound-producing timing of a musical tone color, each of the style data includes sound-producing change data for changing the sound-producing timing of a musical tone color, and the changing means changes the sound-producing data in the performance data so as to be closer to the sound-producing timing indicated by the sound-producing change data, as the style changing amount indicated by the conversion data is larger.

4. A karaoke apparatus according to claim 1, wherein the performance data includes volume data for designating volume of a musical tone color, each of the style data includes volume change data for designating the volume after a change, and the changing means changes the volume data to the volume change data.

5. A karaoke apparatus according to claim 1, wherein the performance data includes tone color data for designating a tone color, each of the style data includes tone color change data for designating a tone color after a change, and data for designating a predetermined value, and the changing means converts the tone color data to the tone color change data when a value of the conversion data exceeds the predetermined value, and conducts no conversion of the tone color data when the value of the conversion data is lower than the predetermined value.

6. A karaoke apparatus according to claim 1, wherein each of the style data includes additional performance data for indicating a musical tone color of an additional instrument, and data for designating a predetermined value, and the changing means adds the additional performance data to the performance data when a value of the conversion data exceeds the predetermined value, and conducts no addition of the additional performance data when the value of the conversion data is lower than the predetermined value.

7. A karaoke apparatus as claimed in claim 1, further comprising a microphone having a hood and a cone-like grip portion, including a disk-like style selection switch disposed therebetween having an axis common with that of said cone-like grip portion.

8. A karaoke apparatus as claimed in claim 7, wherein said style selection switch rotates about a common axis shared with said cone-like grip portion enabling a user to select a desired style.

9. A karaoke apparatus as claimed in claim 8, wherein said style is at least one previously prepared style selected from the group consisting of bossa nova, samba, and jazz.

10. A style change apparatus comprising:

a storage device that stores performance data and stores style data for changing the style of an original music piece to various styles;

a first input circuit that inputs a desired style;

a second input circuit that inputs conversion data indicating an amount of a style change between the style of the original music piece and the desired style; and a CPU that changes the performance data of the original music piece, based on the style data corresponding to the input desired style, the conversion data, and a threshold value, wherein the CPU utilizes a changing map including the performance data, the style data, and the conversion data for changing the performance data of the original music piece when the amount of style change exceeds the threshold value.

11. A style change apparatus in accordance with claim 10, further comprising:

a monitor for displaying an image including words and a background in accordance with progress of the music piece;

an image storage device that stores images that are to be displayed on the monitor;

a display that reads out the image designated by the style data corresponding to the desired input through the first input circuit, from the image storage device, and that displays the image on the monitor;

a synthesizer that synthesizes a performance signal based on the performance data which is changed by the CPU with a voice signal from a microphone; and a sound producing circuit that produces sounds based on an output signal of the synthesizer, wherein the storage device stores display data for designating an image which is to be displayed on the monitor, and wherein each of the style data includes display change data that changes an image to be displayed on said monitor.

12. A style change apparatus according to claim 10, wherein the performance data includes sound-producing data that designates sound-producing timing of a musical tone color, each of the style data includes sound-producing change data that changes the sound-producing timing of a musical tone color, and the CPU changes the sound-producing data in the performance data so as to be closer to the sound-producing timing indicated by the sound-producing change data, as the style changing amount indicated by the conversion data is larger.

13. A style change apparatus according to claim 10, wherein the performance data includes volume data that designates volume of a musical tone color, each of the style data includes volume change data that designates the volume after a change, and the CPU changes the volume data to the volume change data.

14. A style change apparatus according to claim 10, wherein the performance data includes tone color data for designating a tone color, each of the style data includes tone color change data that designates a tone color after a change, and data that designates a predetermined value, and the CPU converts the tone color data to the tone color change data when a value of the conversion data exceeds the predetermined value, and performs no conversion of the tone color data when the value of the conversion data is lower than the predetermined value.

15. A style change apparatus according to claim 10, wherein each of the style data includes additional performance data that indicates at least a musical tone color of at least an additional instrument, and data that designates a predetermined value, and the CPU adds the additional performance data to the performance data when a value of the conversion data exceeds the predetermined value, and performs no addition of the additional performance data when the value of the conversion data is lower than the predetermined value.

16. A karaoke apparatus comprising:
   a storing device that stores performance data and style data for changing the style of an original music piece to various styles;
   a first inputting device that inputs a desired style;
   a second inputting device that inputs conversion data indicating an amount of a style change between the style of the original music piece and the desired style; and
   a changing device that is responsive to said first and second inputting device for changing the performance data of the original music piece, based on the style data corresponding to the input style, the conversion data, and a threshold value,
   wherein the changing device utilizes a changing map including the performance data, the style data, and the conversion data for changing the performance data of the original music piece when the amount of style change exceeds the threshold value.

17. A karaoke apparatus as claimed in claim 16, further comprising:
   a monitor for displaying an image including words and a background in accordance with progress of the music piece shown thereon;
   an image storing device that stores images which are to be displayed on said monitor;
   a display device that reads out the image designated by the style data corresponding to the style which is input through said first inputting device, from said image storing device, and for displaying the image on said monitor;
   a synthesizing device that synthesizes a performance signal based on the performance data which is changed by said changing device with a voice signal from a microphone; and
   a sound producing device that produces sounds based on an output signal of said synthesizing device, wherein said storing device stores display data for designating an image which is to be displayed on said monitor, and each of the style data includes display change data for changing an image to be displayed on said monitor.

18. A karaoke apparatus according to claim 16, wherein the performance data includes sound-producing data for designating sound-producing timing of a musical tone color, each of the style data includes sound-producing change data for changing the sound-producing timing of a musical tone color, and the changing device changes the sound-producing data in the performance data so as to be closer to the sound-producing timing indicated by the sound-producing change data, as the style changing amount indicated by the conversion data is larger.

19. A karaoke apparatus according to claim 16, wherein the performance data includes volume data for designating volume of a musical tone color, each of the style data includes volume change data for designating the volume after a change, and the changing device changes the volume data to the volume change data.

20. A karaoke apparatus according to claim 16, wherein the performance data includes tone color data for designating a tone color, each of the style data includes tone color change data for designating a tone color after a change, and data for designating a predetermined value, and the changing device converts the tone color data to the tone color change data when a value of the conversion data exceeds the predetermined value, and conducts no conversion of the tone color data when the value of the conversion data is lower than the predetermined value.

21. A karaoke apparatus according to claim 16, wherein each of the style data includes additional performance data for indicating a musical tone color of an additional instrument, and data for designating a predetermined value, and the changing device adds the additional performance data to the performance data when a value of the conversion data exceeds the predetermined value, and conducts no addition of the additional performance data when the value of the conversion data is lower than the predetermined value.

22. A method of performing a style change on a musical apparatus, the method comprising the steps of:
   storing performance data and storing style data for changing a style of an original music piece to various styles;
   inputting a desired style;
   inputting conversion data indicating an amount of a style change between the style of the original music piece and the desired style; and
   changing the performance data of the original music piece, based on the style data corresponding to the desired style, the conversion data, and a threshold value,
   wherein the changing of the performance data of the original music piece utilizes a changing map including the performance data, the style data, and the conversion data for changing the performance data of the original music piece when the amount of style change exceeds the threshold value.

* * * * *